United States Patent
Holubec

(10) Patent No.: US 9,338,618 B2
(45) Date of Patent: May 10, 2016

(54) HOME ROUTING SYSTEM AND METHOD FOR MOBILE NETWORKS

(71) Applicant: MARKPORT LIMITED, Dublin (IE)

(72) Inventor: Tomas Holubec, Brno (CZ)

(73) Assignee: MARKPORT LIMITED, Dublin (IE)

( * ) Notice: Subject to any disclaimer, the term of this patent is extended or adjusted under 35 U.S.C. 154(b) by 0 days.

(21) Appl. No.: 14/379,391

(22) PCT Filed: Feb. 6, 2013

(86) PCT No.: PCT/EP2013/052295
§ 371 (c)(1),
(2) Date: Aug. 18, 2014

(87) PCT Pub. No.: WO2013/124152
PCT Pub. Date: Aug. 29, 2013

(65) Prior Publication Data
US 2015/0024740 A1    Jan. 22, 2015

Related U.S. Application Data

(60) Provisional application No. 61/602,205, filed on Feb. 23, 2012.

(51) Int. Cl.
*H04W 4/00* (2009.01)
*H04W 4/14* (2009.01)
*H04W 8/04* (2009.01)
(Continued)

(52) U.S. Cl.
CPC *H04W 4/14* (2013.01); *H04W 8/04* (2013.01); *H04W 8/08* (2013.01); *H04W 12/12* (2013.01); *H04W 88/184* (2013.01)

(58) Field of Classification Search
CPC .................................................. H04W 88/184
USPC ........................................................ 455/433
See application file for complete search history.

(56) References Cited

U.S. PATENT DOCUMENTS 5,854,982 A * 12/1998 Chambers ............... H04W 8/12
455/433
7,996,024 B2   8/2011 Nooren
(Continued)

FOREIGN PATENT DOCUMENTS

WO    2006/056791 A1    6/2006

OTHER PUBLICATIONS

International Preliminary Report on Patentability of the International Searching Authority; PCT/EP2013/052295; issued on Aug. 26, 2014.
(Continued)

*Primary Examiner* — Sam K Ahn
*Assistant Examiner* — Fabricio R Murillo Garcia
(74) *Attorney, Agent, or Firm* — Ohlandt, Greeley, Ruggiero & Perle, L.L.P.

(57) ABSTRACT

A home router network element assigns a correlation key including an LMS1 to an MSISDN in such a way that the risk of short message mis-delivery to a wrong mobile subscriber is very much reduced. This is achieved by projection of MSISDN ranges on correlation key ranges while the correlation key is still unpredictable. The level of correlation key unpredictability is determined by applicable numbering plans and for practical purposes avoids the chance that an MT message originated by a fraudulent party is successfully delivered via the home router.

10 Claims, 2 Drawing Sheets

(51) Int. Cl.
*H04W 8/08* (2009.01)
*H04W 12/12* (2009.01)
*H04W 88/18* (2009.01)

(56) References Cited

U.S. PATENT DOCUMENTS

| | | | |
|---|---|---|---|
| 2004/0133623 A1* | 7/2004 | Murtagh et al. | 709/200 |
| 2008/0004047 A1 | 1/2008 | Hill et al. | |
| 2010/0014494 A1* | 1/2010 | Schmidt et al. | 370/338 |
| 2010/0235911 A1* | 9/2010 | Nooren | 726/22 |
| 2010/0255812 A1* | 10/2010 | Nanjundaiah | H04M 3/42017 455/411 |
| 2010/0330955 A1* | 12/2010 | Chan | H04W 8/265 455/406 |

OTHER PUBLICATIONS

Written Opinion of the International Searching Authority; PCT/EP2013/052295; issued on Aug. 26, 2014.
International Search Report; PCT/EP2013/052295; May 27, 2013.

* cited by examiner

HOME ROUTING SYSTEM AND METHOD FOR MOBILE NETWORKS

INTRODUCTION

1. Field of the Invention

The invention relates to Home Routing in mobile networks.

2. Prior Art Discussion

An SM is delivered to a mobile phone by sending an MT-FWSM request in a GSM network. To send an MT-FWSM request the routing information must be known. The routing information in the GSM network is obtained by sending an SRI-SM request to the appropriate HLR, In GSM the routing information from the HLR allows direct delivery of a short message to a subscriber without involving the subscriber's messaging infrastructure (SMSC). The MT-FWSM contains the mobile phone network identification (IMSI) received from Inc HLR in the SRI-SM based on the mobile phone MSISDN.

When the GSM operator wants or must (due to legal act) be involved in delivery of an SM to its subscriber a Home Router function can be implemented.

Referring to FIG. 1, in GSM networks the Home Router is positioned in front of the HLR. All SRI-SM requests are routed to the Home Router instead of the HLR (1). The Home Router provides (in collaboration with the HLR (2), (3)) an SRI-SM response containing the Home Router address instead of the MSC address (4). The MT-FWSM request is then destined to the Home Router (5) which applies the requested service and sends information using another MT-FWSM to the mobile phone (6), Because services use is to be defined on an MSISDN basis the Home Router maintains a cache allowing recall of an MSISDN from the SRI-SM request based on the IMSI from the MT-FWSM request.

For security purposes the IMSI provided by the Home Router to the F-SMSC might not be a real IMSI but an MT Correlation ID. However the F-SMSC is unable to distinguish it—MT Correlation ID is transported in the same protocol field as IMSI.

The MT Correlation ID is defined by 3GPP as follows:

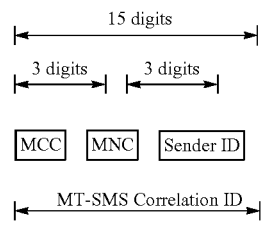

The MT Correlation ID is composed of three parts:
a) Mobile Country Code (MCC) of the HPLMN of the receiving MS. It consists of three decimal digits.
b) Mobile Network Code (MNC) of the HPLMN of the receiving MS. It consists of three decimal digits. If the MNC of the HPLMN of the receiving MS is 2 digits only in length, the first digit of the MSIN shall be appended to the right hand side,
c) Sender ID. It consists of nine decimal digits and is unique for its lifetime. For security purposes, its value is a number allocated at random, rather than sequentially.

Thus, the Home Router is allowed and/or requested to hide the real subscriber identity (IMSI) and provide the fake one, the MT Correlation ID, to the outside world. For security purposes 3GPP suggests that the MT Correlation ID is generated randomly and kept valid for a limited time period only.

US2010/0235911 describes generation of a synthetic SRI-SM-resp to detect a spoofed message, This involves creation of a synthetic IMSI and MSC address in the SRI-SM-resp in which an SC Address and the MSISDN from the SRI-SM is transported.

It appears that generation of an MT Correlation ID sequentially or at random by the Home Router suffers from the risk that a single MT Correlation ID is generated for two different MSISDNs in a too short period and as a consequence misdelivery of the MT-FWSM to a wrong recipient may occur.

The invention addresses this problem.

Glossary of terms and their definitions:
SMSC—Short Message Service Centre
SRI-SM—Send Routing Info for Short Message
MT-FWSM—Mobile Terminated Forward Short Message
MSISDN—Mobile Subscriber International Subscriber Dial Number
IMSI—international Mobile Subscriber Identifier
LMSI—Local Mobile Station identity
GT—Global Title
Home Router—SMS Router and/or IP-SM-GW
MCC—Mobile Country Code
MNC—Mobile Network Code
SM—Short Message

SUMMARY OF THE INVENTION

According to the invention, there is provided a home routing method in a mobile network comprising a home routing element and a HLR or equivalent, the method comprising:
- a message service centre sending a routing request to the HLR, with the intention of sending a message to a recipient;
- the home routing element receiving the routing request and obtaining a routing response from the HLR.
- the home routing element sending a modified routing response to the message service centre, and the message service centre or another service centre sending a message according to an address provided in the modified routing response
- wherein the modified routing response includes a correlation key which is decoupled from the recipient subscriber identifier (IMSI) but is linked with a recipient network address (MSISDN) which is retrieved for forwarding the message on.

In one embodiment, the correlation key is decoupled from the recipient subscriber identifier (IMSI) but is linked with a recipient network address (MSISDN) which is retrieved for an application of a service associated with a recipient MSISDN address.

In one embodiment, the correlation key includes a Local Mobile Station Identity (LMSI).

In one embodiment, the LMSI is assigned to an MSISDN. In one embodiment, a LMSI from a set of LMSIs dedicated to a particular MSISDN is assigned at random. Preferably, an MSISDN range is assigned with the ID being part of the LMSI.

In one embodiment, the method pre serves randomness because there is a single MSISDN mapping on multiple LMSIs chosen in random sequence, while inversion mapping from LMSI to MSISDN remains unique in a history, in which a single MSISDN is assigned with multiple LMSIs but a single LMSI is never re-used for multiple MSISDNs.

In one embodiment, identified MSISDN ranges are projected on LMSI ranges in such a way that each identified MSISDN prefix is assigned with an identifier which is incorporated into a LMSI and appended with all digits copied from an MSISDN part behind prefix digits.

In one embodiment, a part of the LMSI of which size depends on identified MSISDN ranges and total length of the MSISDN, is filled by a random number generator which makes it hard for the fraudulent party to guess the LMSI actually used.

In one embodiment, the method comprises the further steps of using the LMSI as a correlation key for fake message detection.

In another embodiment, the method comprises the further steps of using the LMSI as a correlation key far recipient MSISDN determination.

In another aspect, the invention provides a mobile network home routing system comprising a digital processor and interfaces, in which the processor is adapted to perform the steps in a mobile network of:

receiving from a message service centre a routing request to a HLR, with the intention of sending a message to a recipient;

obtaining a muting response from the HLR, and sending a modified routing, response to the message service centre, causing the message service centre or another service centre to send a message according to an address provided in the modified routing response;

wherein the modified routing response includes a correlation key which is decoupled from the recipient subscriber identifier (IMSI) but is linked with a recipient network address (MSISDN) which is retrieved for forwarding the message on.

In one embodiment, the correlation key includes a Local Mobile Station Identity (LMSI). Preferably, the system is adapted to assign the LMSI to an MSISDN. In one embodiment, a LMSI from a set of LMSIs dedicated to a particular MSISDN is assigned at random. in one embodiment, an MSISDN range is assigned with the ID being part of the LMSI, In one embodiment, the system is adapted to preserve randomness by applying a single MSISDN mapping on multiple LMSIs chosen in random sequence, while inversion mapping from LMSI to MSISDN remains unique in a history, in which a single MSISDN is assigned with multiple LMSI is but a single LMSI is never re-used for multiple MSISDNs.

In one embodiment, the system is adapted to project identified MSISDN ranges on LMSI ranges in such a way that each identified MSISDN prefix is assigned with an identifier which is incorporated into a LMSI and appended with all digits copied from an MSISDN part behind prefix digits.

In one embodiment, a part of the LMSI of which size depends on identified MSISDN ranges and total length of the MSISDN, is filled by a random number generator which makes it hard for the fraudulent party to guess the LMSI actually used.

In a further aspect, the invention provides a computer readable medium comprising software code for performing the steps of a method as defined above in any embodiment when executing on a digital processor.

DETAILED DESCRIPTION OF INVENTION

The invention will be more clearly understood from the following description of some embodiments thereof, given by way of example only, with reference to the accompanying drawings, in which.

Figure 1:
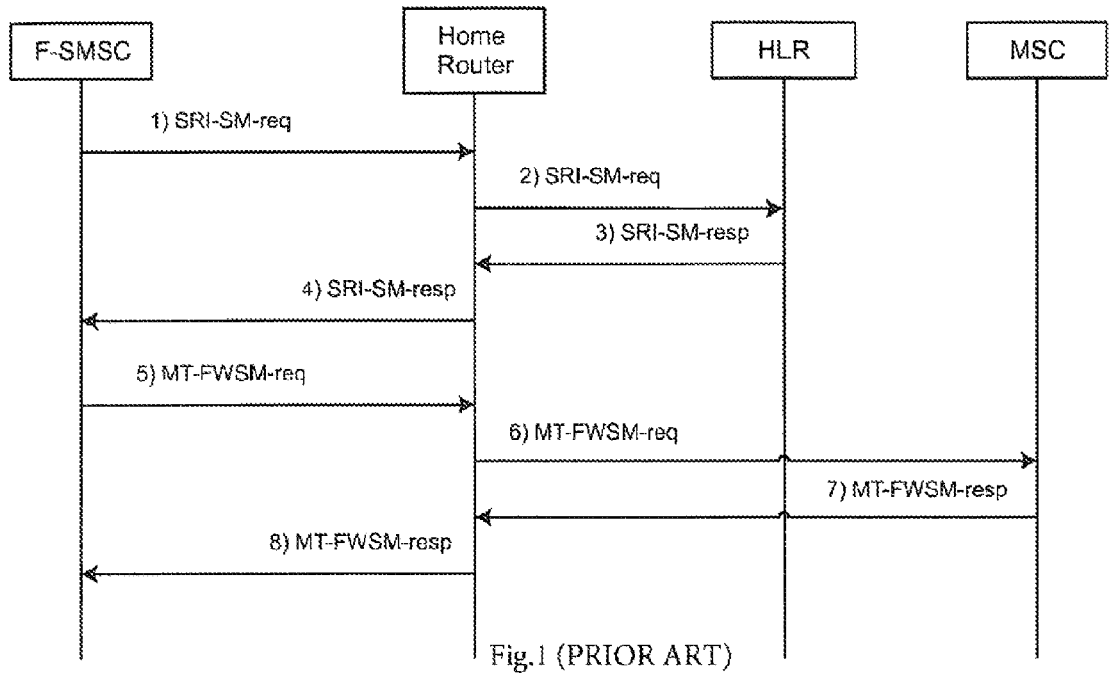
FIG. 1 is a ladder diagram illustrating a message sequence of the prior art for sending an MT-FWSM message, as outlined above.
Figure 2:
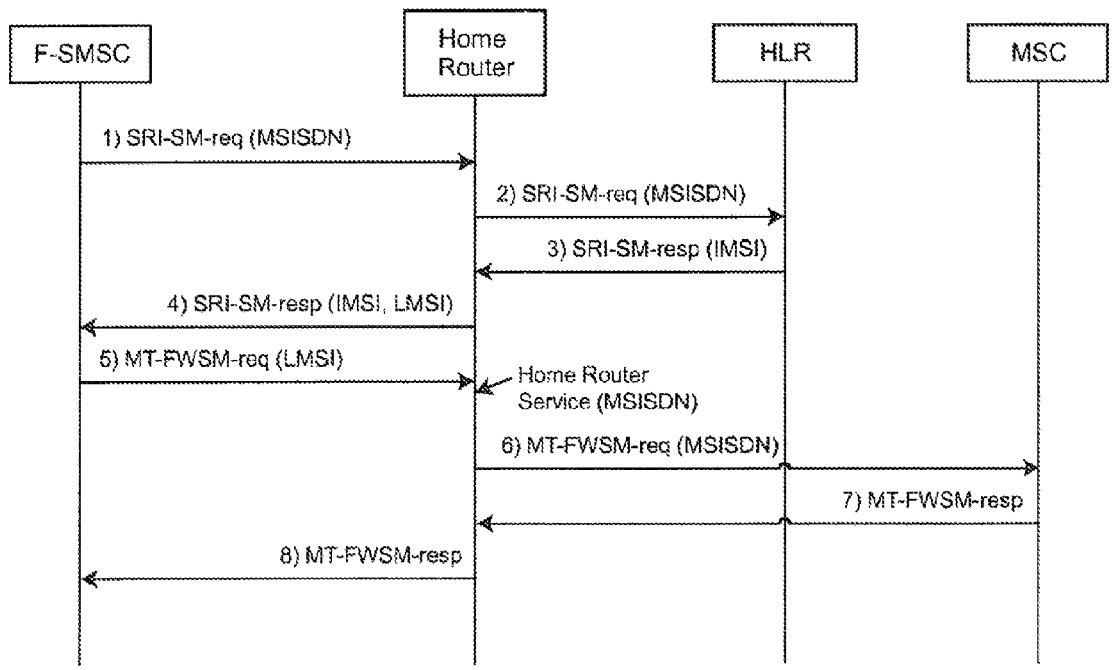
FIG. 2 is an equivalent diagram for the invention.

Referring to FIG. 2 the invention provides an extension of the Home Routing mechanism, in which the LMSI field functions as a correlation key between an SRI-SM and an MT-FWSM instead of IMSI/MT Correlation ID, This decouples the subscriber identity and the correlation key.

Normally, the LMSI is allocated by the VLR to a foreign subscriber roaming in the network. The LMSI locally identifies a subscriber in a particular VLR. Depending on implementation, with a LMSI a VLR might lookup subscriber data more efficiently. When a LMSI is allocated and thus is contained in an SRI-SM response, the F-SMSC. uses the LMSI instead of the IMSI.

In the invention, since delivery of the MT-FWSM message via the Home Router is decoupled from the IMSI field by the invention, this field can contain any value from a range assigned to the operator. But for security purposes, in the invention an unreal IMSI is returned, i.e. not belonging to an existing subscriber. In that ease, even when all SRI-SM responses (for any MSISDN) contain the same unreal IMSI, the Home Routing mechanism enhanced with LMSI as described in the invention still works.

Responding with an unreal IMSI as described above improves security of all operator's subscribers since such IMSI would never allow unsolicited MT-FWSM (spam) delivery (even to random recipient) when Home Router is bypassed.

Using an LMSI as a correlation key enhances detection of faked MT messages (spam) based on correlation of an MT message with an SRI message, When correlation fails the message is considered as faked by this mechanism.

Using LMSI as a correlation key, also enhances the mechanism of allowing the system to determine the recipient MSISDN of an MT message based on correlation of an MT message with an SRI message. Knowing the recipient MSISDN of an MT message is essential for Home Routers to be able to apply optional service improving subscribers experience or required by legal act.

The method of the invention assigns the correlation key (primarily LMSI but re-usable with MT Correlation ID as well) to an MSISDN in such a way that the risk of short message in is-delivery to a wrong mobile subscriber is eliminated. This is achieved by projection of MSISDN ranges on correlation key ranges while the correlation key is still unpredictable. The level of correlation key unpredictability is determined by applicable numbering plans and decreases the probability that an MT message originated by a fraudulent parry is successfully delivered via the Home Router.

Figure 3:
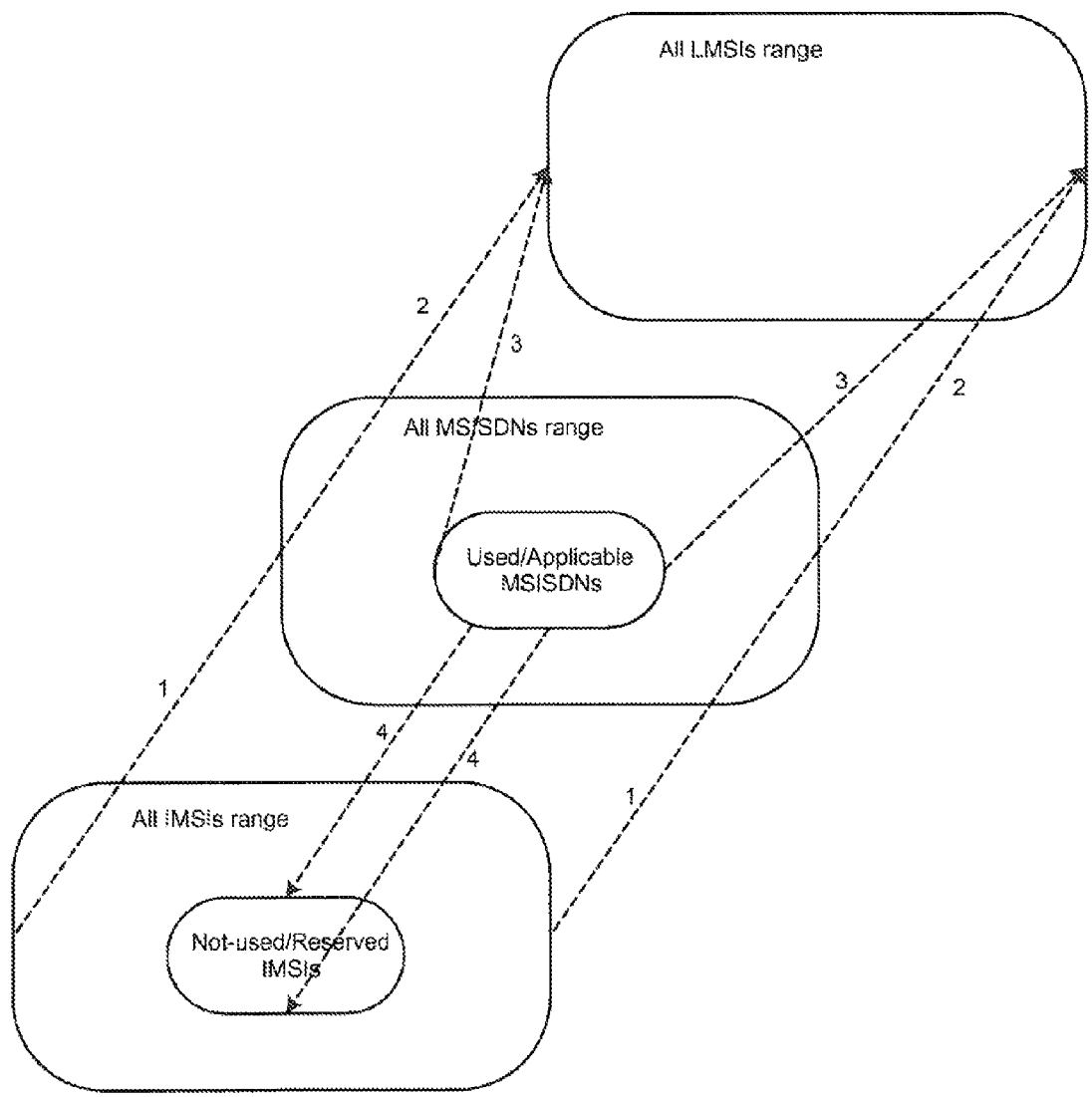
FIG. 3 is a flow diagram showing use of number ranges.

Referring to FIG. 3, the theoretical size of a set of all MSISDNs is approximately of the same magnitude as the set of all IMSIs (1) and also of the same magnitude as the size of all LMSIs (2). There can be milliards ($10^9$) MSISDNs and IMSIs in a country. There are also also milliards ($10^9$) of LMSI values.

However, in real applications, only a limited number of MSISDNs, determined by prefixes resulting from applicable numbering plans, is used and thus mapping of a single MSISDN on multiple LMSIs (where no numbering plan applies) does exist (3) since the number of really used MSISDNs is much lower than total number of available LMSI values.

In real applications, also the limited set of IMSIs, determined by prefixes resulting from numbering plans, is used and thus a mapping of a used MSISDN on one or more unused IMSIs does exist (4).

The invention provides use of a LMSI instead of an IMSI/MT Correlation ID for correlation between SRI-SM and MT-FWSM, That allows the Home Router to decouple the recipient subscriber identity exposed to the network using a correlation key which is valid for delivery via the Home Router for a short period.

The IMSI/MT Correlation ID does not overlap with an existing real IMSI. It can be either always the same Sender ID or random digits from a reserved range. That ensures that the MT Correlation ID is not misused for bypassing the Home Router and direct delivery to MSC for any subscriber.

The method also includes assigning a LMSI to an MSISDN. Sequential assignment of LMSI to MSISDN is not optimum because of predictability. Also, random assignment is not optimum because of fatal in is-delivery risk.

There is a finite mis-delivery risk because the range of available IDs ($2^{32}$-1) is not big enough. The range of available Sender IDs in case of MT Correlation ID not decoupled from correlation key is even smaller—$10^9$ only.

A Home Router sized for 10×10000 SRI-SM + 10×10000 MT-FWSM per second overflows Sender IDs in 12 hours, which is less than retry intervals and/or validity periods used by SMSCs.

If the F-SMSC caches an SRI and reuses cached information after a retry interval there is a risk that the same F-SMSC has recently received the same LMSI for different MSISDN, and mis-delivery occurs.

Case Study:
System load: 100 000 SRIs/sec
Available IDs: 4 294 967 295
Overflow period: 11.93 hours
LMSI validity=60 sec
Valid LMSIs in a system: 100 000×60=6 000 000/sec
Misdelivery probability: 0.139%
Misdelivery rate: 139 SMs/sec The study above expects the same SC Address in all SRIs. Variability of SC Addresses decreases the mis-delivery probability, however the majority of SRIs would come from several F-SMSCs (if majority of SRIs come from 10 different F-SMSCS the misdelivery rate is not 139 per sec but 13.9 per sec). Having MT Correlation ID validity selectively lower would bring another improvement, but a number of messages would be still mis-delivered per day.

The method of the invention preserves randomness because there is a single MSISDN mapping on multiple LMSIs chosen in random sequence, while inversion mapping from LMSI to MSISDN remains unique in a history, i.e. a single MSISDN is assigned with multiple LMSIs but a single LMSI is never re-used or multiple MSISDNs. That makes it hard for a fraudulent party to guess the LMSI which is actually valid for SM delivery on the Home Router, however the SM is never mis-delivered to a wrong subscriber when the F-SMSC uses routing information caching.

The method benefits from the fact that although the space of possible MSISDNs is of the same magnitude as the space of available LMSIs the reality is very often different. In the first phase of the method the numbering plans of a given country are analyzed and MSISDN ranges applicable. to the Home Router are identified.

Example Phase 1: There is a country in which the numbering plan uses an MSISDN consisting of 12 digits (including Country Code, National Destination Code and Subscriber Number), However in case of 3 digits Country Code not all 10 MSISDNs are applicable for Home Routing, but only the mobile phone ranges. In this example the following MSISDN ranges identified by MSISDN prefix have resulted from analysis:

420601, 42,0602, 420603, 420604, 420605, 420606, 420607, 420608, 42072, 42073, 42077, 42079

In the second phase of the method the identified ranges are projected on LMSI ranges in such a way that each identified MSISDN prefix is assigned with an ID which is incorporated into an LMSI and appended with all digits copied from an MSISDN part behind the prefix digits, ID of prefix and copied digits create unique identification of subscriber in a history.

The remaining part of LMSI (padding), which size depends en identified MSISDN ranges and total length of MSISDN, is filled by a random number generator which makes it hard for a fraudulent party to guess the LMSI actually used.

Example Phase 2: There is an LMSI assigned to each MSISDN range identified in phase 1. '#' denotes MSISDN digits copied from MSISDN part behind the prefix digits, '?' denotes the random padding.

| MSISDN range | Assigned LMSI |
|---|---|
| 420601 | 01######?? |
| 420602 | 02######?? |
| 420603 | 03######?? |
| 420604 | 04######?? |
| 420605 | 05######?? |
| 420606 | 06######?? |
| 420607 | 07######?? |
| 420608 | 08######?? |
| 42072 | 1#######?? |
| 42073 | 2#######?? |
| 42077 | 3#######?? |
| 42079 | 40#######? |

The invention is not limited to the embodiments described but may be varied in construction and detail.

The invention claimed is:

1. A home routing method in a mobile network comprising a home routing element and a home location register (HLR) or equivalent, the method comprising
   sending, by a message service center, a routing request to the HLR, with the intention of sending a message to a recipient;
   receiving, by the home routing element, the routing request;
   obtaining, by the home routing element, a routing response from the HLR;
   sending, by the home routing element, a modified routing response to the message service center, said modified routing response including a mobile subscriber international subscriber directory number (MSISDN) for application of a service, and a correlation key; and
   sending by the message service center or another service center, the message according to the MSISDN provided in the modified routing response;
   wherein the correlation key is decoupled from a recipient international mobile subscriber identifier (IMSI) but is linked with a recipient MSISDN whereby the recipient MSISDN can be determined from the correlation key, and
   wherein the correlation key includes a local mobile station identity (LMSI) assigned at random from a larger set of LMSIs dedicated to the recipient MSISDN.

2. The home routing method as claimed in claim 1, further comprising an MSISDN range assigned with an identifier that is part of the LMSI.

3. The home routing method as claimed in claim 1, wherein the method preserves randomness of the correlation key because there is a single MSISDN mapping on multiple LMSIs chosen in random sequence, in which a single MSISDN is assigned with the multiple LMSIs but a single LMSI is never re-used for the multiple MSISDNs.

4. The home routing method as claimed in claim 1, wherein the correlation key is constructed in a step which includes projecting MSISDN ranges on LMSI ranges to assign each identified MSISDN prefix with an identifier that is incorporated into a LMSI and appended with all digits copied from an MSISDN part behind said prefix digits of the MSISDN.

5. The home routing method as claimed in claim 1, wherein the correlation key is constructed in a step which includes projecting MSISDN ranges on LMSI ranges to assign each identified MSISDN prefix with an identifier that is incorporated into a LMSI and appended with all digits copied from an MSISDN part behind said prefix digits of the MSIDSN, and
wherein the LMSI has a part of which size depends on identified MSISDN ranges and total length of the MSISDN is filled by a random number generator.

6. A mobile network home routing system comprising a digital processor and interfaces, in which the processor is configured to:
receive a routing request from a message service center for routing a message to a recipient, and obtain a routing response from a home location register (HLR), send a modified routing response to the message service center, said modified routing response including a mobile subscriber international subscriber directory number (MSISDN) for application of a service, and a correlation key,
receive a message with the correlation key provided in the routing response,
wherein the correlation key is decoupled from the recipient subscriber identifier IMSI but is linked with the recipient MSISDN whereby the recipient MSISDN can be determined from the correlation key, and
wherein the correlation key includes a local mobile station identity (LMSI) assigned at random from a larger set of LMSIs dedicated to the recipient MSISDN.

7. The home routing system as claimed in claim 6, wherein the system is adapted to preserve randomness of the correlation key by applying a single MSISDN mapping on multiple LMSIs chosen in random sequence, in which a single MSISDN is assigned with the multiple LMSIs but a single LMSI is never re-used for the multiple MSISDNs.

8. The home routing system as claimed in claim 6, wherein the system is adapted to construct the correlation key by projection of identified MSISDN ranges on LMSI ranges to assign each identified MSISDN prefix with an identifier which is incorporated into a LMSI and appended with all digits copied from an MSISDN part behind said prefix digits of the MSISDN.

9. The home routing system as claimed in claim 6, wherein the system is adapted to construct the correlation key by projection of identified MSISDN ranges on LMSI ranges to assign each identified MSISDN prefix with an identifier which is incorporated into a LMSI and appended with all digits copied from an MSISDN part behind said prefix digits of the MSISDN, and wherein the LMSI has a part of which size depends on identified MSISDN ranges and total length of the MSISDN filled by a random number generator.

10. A non-transitory computer readable medium comprising software code for performing the steps of a method, when executing on a digital processor, the method comprising:
sending, by a message service center, a routing request to a home location register (HLR), with the intention of sending a message to a recipient;
receiving, by a home routing element, the routing request;
obtaining, by the home routing element, a routing response from the HLR;
sending, by the home routing element, a modified routing response to the message service center, the modified routing response including a mobile subscriber international subscriber directory number (MSISDN) for application of a service, and a correlation key; and
sending, by the message service center or another service center, the message according to the MSISDN provided in the modified routing response;
wherein the correlation key is decoupled from a recipient international mobile subscriber identifier (IMSI) but is linked with the recipient MSISDN whereby the recipient MSISDN can be determined from the correlation key, and
wherein the correlation key includes a local mobile station identity (LMSI) assigned at random from a larger set of LMSIs dedicated to the recipient MSISDN.

* * * * *